United States Patent [19]
Boschen et al.

[11] 3,729,867
[45] May 1, 1973

[54] VEHICLE WINDOW SYSTEM

[75] Inventors: John A. Boschen, Royal Oak, Mich.; Reid E. Francis, Dearborn, both of Mich.

[73] Assignee: Ford Motor Company, Dearborn, Mich.

[22] Filed: Sept. 13, 1971

[21] Appl. No.: 179,894

[52] U.S. Cl. ...........................49/98, 49/103, 49/163
[51] Int. Cl. ..............................................E05f 11/38
[58] Field of Search.........................49/98, 103, 142, 49/227, 168, 163, 164, 62, 48, 108

[56] References Cited

UNITED STATES PATENTS 2,122,963    7/1938    Susor..................................49/108 X

*Primary Examiner*—Kenneth Downey
*Attorney*—Keith L. Zerschling et al.

[57] ABSTRACT

A vehicle window system for raising and lowering in a window opening in a vehicle body structure a window panel vertically divided into coplanar visibility and ventilation sections. The system includes a window regulator mechanism for vertically moving the ventilation section of the window panel relatively to its visibility section. The window regulator mechanism is characterized in that it comprises a guide bracket supported on the visibility section for directing movement of the ventilation section, arm means carried by the guide bracket supporting and controlling the movement of the ventilation panel and biasing means normally urging the arm means and, therefore, the ventilation section in a direction of vertical displacement relative to the visibility section. Movement of the ventilation section relative to the visibility section is controlled by a cam member carried on a vehicle body panel. The vehicle body panel forms one wall of the window well receiving the window panel in lowered position.

4 Claims, 2 Drawing Figures

Patented May 1, 1973

3,729,867

INVENTORS
John A. Boschen
BY Reid E. Francis
Keith L. Zerschling
John J. Roethel
ATTORNEYS

VEHICLE WINDOW SYSTEM

BACKGROUND OF THE INVENTION

For many years, the front doors of automobile bodies made in the United States were equipped with a conventional main window panel that could be vertically raised and lowered relative to a window opening and an auxiliary or ventilation window panel forwardly of the main panel. The ventilation panel was pivotable about a substantially vertical axis and was not adapted to be raised or lowered. With the advent of windshields having a greater rearward inclination, the use of pivoted vent windows fell somewhat in disfavor. It was difficult to hinge the sharply triangular piece of glass that had to be used. The pivotal vent window structure preferably required an upstanding frame structure on the door. This created a conflict with a desire to use frameless windows, particularly on the hard top models. As a result, the pivoted vent window was eliminated in many models and the front door window became a large frameless piece of glass.

The elimination of pivoted vent windows has raised some customer dis-satisfaction. The pivoted vent window provided a desirable exhaust flow of air from the vehicle interior that has not been duplicated by other systems. As recognized in U.S. Pat. No. 1,770,747 issued July 15, 1930 to William D. Crowell, the area immediately to the rear of the vehicle windshield pillar is a low pressure area when a vehicle is moving. An opening in this area provides an efficient means for exhausting air from the vehicle interior.

The Crowell patent discloses a vertical division of the window panel into independently movable sections so that the forward section could be raised or lowered to provide the desired amount of exhaust openings. In the Crowell disclosure, each window panel section was operated by an independent window regulator mechanism and each panel section was guided within fixed guide bars including a fixed division bar between the two sections.

It is an object of the present invention to provide a substantially frameless window vertically divided into a small ventilation section and a large visibility section. The small ventilation section is constructed and arranged to provide for movement from a closed to a fully opened position, or any intermediate position therebetween, relative to the visibility section. Or, if desired, the ventilation and visibility sections may be retracted as a unit into the vehicle window well to provide a full window opening.

SUMMARY OF THE INVENTION

This invention relates to a vehicle window system comprising a window panel adapted to be raised and lowered vertically in a vehicle body window opening in substantially parallel relationship to a vehicle body panel defining one side of a window well. The window panel is vertically divided into coplanar visibility and ventilation sections. A window regulator mechanism is provided for vertically moving the ventilation section relative to the visibility section. The window regulator mechanism is characterized in that it comprises a guide bracket supported on the visibility section for guiding the ventilation section along an adjacent edge of the visibility section during vertical movement. An arm means is pivotally mounted on the guide bracket and coupled to the ventilation section for moving the latter on the guide bracket. A biasing means urges the arm means in a direction to lower the ventilation section relative to the visibility section. A cam means is pivotally supported on the vehicle body panel and is engageable with the arm means to drive the latter against resistance of the biasing means in a direction to raise the ventilation section. An operating means is provided for moving the cam means.

DESCRIPTION OF THE DRAWING

Other objects, advantages and features of the present invention will become more apparent as this description proceeds, reference being had to the accompanying drawings, wherein.

DETAILED DESCRIPTION OF THE INVENTION

Figure 1:
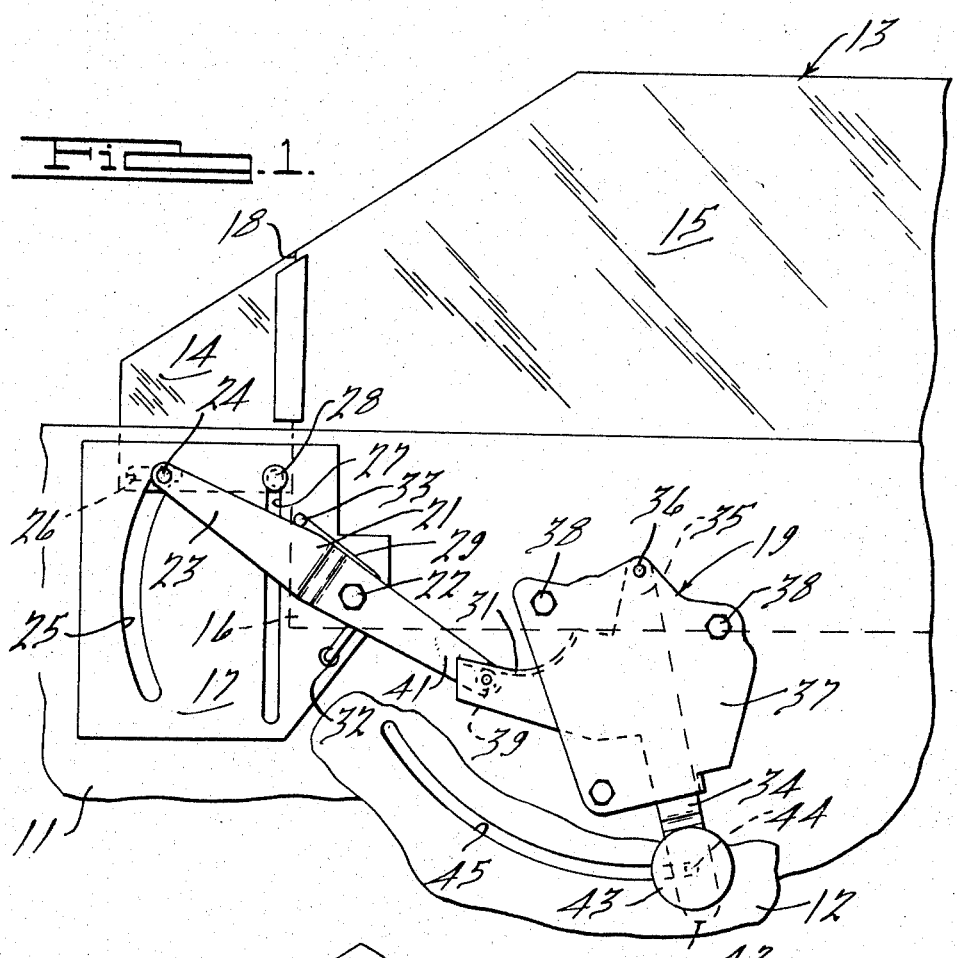
FIG. 1 is a semi-diagrammatic view of a vehicle window system embodying the present invention.

Referring now to the drawing, there is illustrated a fragmentary portion of a vehicle body structure, such as a vehicle door, having an outer panel 11 and an inner panel 12. The outer and inner panels are spaced from each other to form a window well for receiving a window panel, generally designated 13.

In accordance with the present invention, the window panel 13 is vertically divided into at least two sections, a small ventilation section 14 and a much larger main or visibility section 15. The main or visibility section 15 is adapted to be operatively supported on a conventional window regulator mechanism (not shown) by which it may be lowered into or raised out of the window well.

At its lower left hand corner 16, as viewed in the drawing, the visibility section 15 has bonded thereto a plate bracket 17. The bracket 17 has as its primary function the guidance of the ventilation section 14 along an edge 18 of the visibility section. Such guidance is necessary as the ventilation section is vertically displaced relative to the visibility section, as will be more fully explained.

The bracket 17 may be considered a functional part of an auxiliary window regulator mechanism, generally designated 19, for vertically moving the ventilation section 14 relative to the visibility section 15. The window regulator mechanism 19 is further characterized in that it has an arm 21 pivotally mounted on a pivot stud or shaft 22 which projects through the plate bracket 17 and the lower corner 16 of the visibility section 15. The arm 21 is pivoted intermediate its ends on the shaft 22. One end 23 of the arm 21 carries a pivot stud 24 that projects through a substantially vertically extending arcuate slot 25 in the bracket 17 and a short horizontal slot 26 in the ventilation section 14. The plate bracket 17 has a straight vertical slot 27 which receives a shoulder stud or pin 28. This latter pin 28 and slot 27 arrangement provides vertical stability as the ventilation section is raised or lowered by movement transmitted to the stud 24 on the end 23 of the arm 21. It will be understood that the lifting forces are applied to the ventilation section 14 through the stud 24 which abuts the upper edge of the slot 26 in the ventilation section 14. The slot 26 accommodates the lateral movement of the pin 24 which occurs as the arm 21 swings about its pivot shaft 22.

Swinging movement is imparted to the arm 21 through a spring 29 and a cam member 31. The spring 29 encompasses the pivot shaft 22 and has one leg 32 anchored in the plate bracket 17 and the other end 33 exerting pressure on the arm 21 on its arm end 23 side of the pivot shaft 22. The arrangement is such that the arm 21 is biased by the spring 29 in a counterclockwise direction as viewed in the drawing. That is, the spring 29 urges the ventilation section 14 downward at all times.

The ventilation section 14 is adapted to be driven upwardly relative to the main or visibility section by the cam member 31. The cam member 31 is an appendage to an elongated member 34 pivotally suspended at its upper end 35 from a pivot 36 secured to a plate 38 held by bolts 37 to the inner side of the inner panel 12 of the vehicle body structure. The cam member 31 coacts with a follower 39 on the end 41 of the arm 21.

The lower end 42 of the elongated cam carrying member 34 carries an operating knob 43 mounted on a threaded shaft 44. The shaft 44 projects through an arcuate slot 45 in the inner panel 12 and the trim covering the latter. The knob 43 may be rotated on the threaded shaft 44 to a clamped relationship with the inner panel 12, thus locking the cam carrying member 34 against movement.

OPERATION

Referring now to FIG. 1, the visibility section 15 and the ventilation section 14 are shown in fully raised position so that the window panel 13 fully closes the vehicle body opening. The arm 21 coupled at its upper end 23 to the visibility section 14 is under a biasing force from the spring 29 urging it in a counterclockwise direction. The arm 21 is restrained from rotation in the counterclockwise direction by the interengagement of the follower 39 on the end 41 of the arm 21 with the cam member 31 of the elongated cam carrying member 34.

Figure 2:
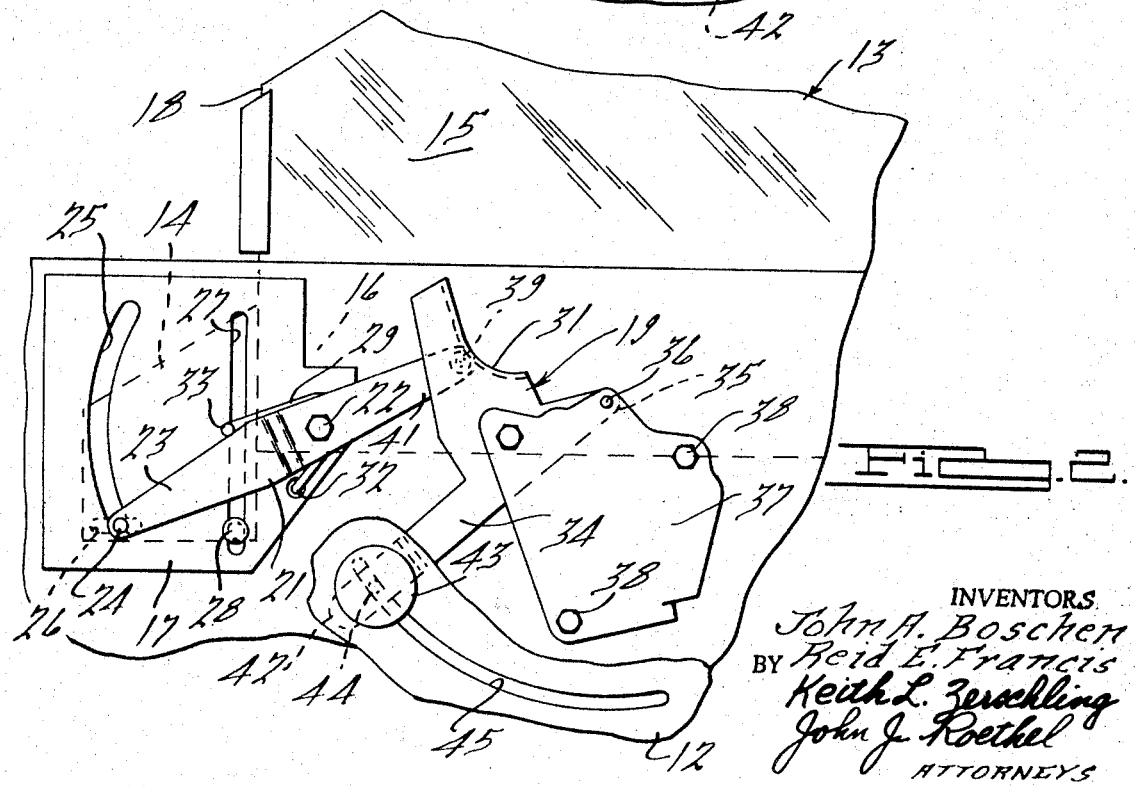
FIG. 2 is a view in part similar to FIG. 1 illustrating the parts of the mechanism embodied in the vehicle window system in a second operative position.

If it is desired to lower the ventilation section 14 to provide for exhaust ventilation from the passenger compartment of the vehicle, this can be done by first releasing the knob 43 to permit free swinging movement of the elongated cam carrying member 34 relative to the inner panel 12 of the vehicle body structure. As the follower 39 is traversed by the cam member 31, the ventilation section 14 becomes vertically displaced downwardly relative to the visibility section 15. This downward movement is guided by the pin 28 and slot 27 relationship and by the connection 24 between the end 23 of the arm 21. A full down position relative to the visibility section 15 is reached when the conditions illustrated in FIG. 2 are attained. The arm 21 has actually been rotated in a counterclockwise direction because of the biasing force of the spring 29. To restore the ventilation section 14 to a raised position relative to the visibility section 15, it is only necessary to swing the cam carrying member 34 in a counterclockwise direction about its pivot axis 36. Such swinging movement of the cam carrying member 34 causes the cam member 31 to exert a downward pressure on the cam follower 39 causing the arm 21 to be swung in a clockwise direction against the resistance of the spring 29 back to the position shown in FIG. 1.

If, with the ventilation section 14 and the visibility section 15 as shown in the FIG. 1 position, the visibility section 15 is lowered independently by its conventional window regulator mechanism, the ventilation section will automatically travel downwardly with the visibility section.

As has been explained, the arm 21 controlling the position of the ventilation section 14 is carried on the plate 17 which is bonded to the lower corner of the visibility section 15. Thus, the arm 21 is carried downwardly with the visibility section 15. As the arm 21 begins its downward movement, the spring 29 causes the arm to rotate in a counterclockwise direction thereby lowering the ventilation section 14. This movement continues until the cam follower 39 is disengaged from the cam member 31 at which time relative movement of the ventilation section 14 to the visibility section 15 ceases and both sections continue to move as far down as the visibility section 15 travels.

When the visibility section is raised, the ventilation section 14 travels upwardly with the former until the follower 39 on the arm 21 abuts the cam member 31. As the visibility section 15 continues to move upwardly, the arm 21 is swung in a clockwise direction causing the ventilation section 14 to be moved relatively to the visibility section 15. In fully closed position of the window panel 13, the ventilation section 14 will have overtaken the visibility section to achieve the FIG. 1 closed position.

The invention disclosed will have many modifications which will be apparent to those skilled in the art in view of the teachings of this specification. It is intended that all modifications which fall within the true spirit and scope of this invention be included within the scope of the appended claims.

We claim:
1. A vehicle window system comprising:
a window panel adapted to be raised and lowered vertically in a vehicle body window opening in substantially parallel relationship to a vehicle body panel defining one side of a window well,
the window panel being vertically divided into coplaner visibility and ventilation sections,
and a window regulator mechanism for vertically moving the ventilation section relative to the visibility section,
the window regulator mechanism being characterized in that it comprises:
a guide bracket supported on the visibility section for guiding the ventilation section along an adjacent edge of the visibility section during vertical movement;
an arm means comprising an arm pivotally mounted intermediate its ends on the guide bracket,
one end of the arm being pivotally coupled to the ventilation section and the other end carrying a cam follower;
biasing means urging the arm means in a direction to lower the ventilation section relative to the visibility section,
cam means comprising a cam support bracket fixed to the vehicle body panel and a cam member pivotally supported on the cam support bracket,
the cam member being movably engageable with the cam follower on the arm to drive the arm means against the resistance of the biasing means in a direction to raise the ventilation section, and operating means for moving the cam member.

2. A vehicle window system according to claim 1, in which:

the biasing means comprises a spring urging the arm in a direction to maintain the follower thereon in alignment with the cam member for engagement therewith.

3. A vehicle window system according to claim 2, in which:

upon the visibility section being lowered, the guide bracket is retracted with the visibility section into the window well and carries the ventilation section with it.

4. A vehicle window system according to claim 1, in which:

upon the visibility section being lowered, the guide bracket is retracted with the visibility section into the window well and carries the ventilation section with it.

* * * * *